United States Patent
Love

(10) Patent No.: US 9,838,207 B2
(45) Date of Patent: Dec. 5, 2017

(54) POWER OVER ETHERNET DELIVERY METHOD AND SYSTEM

(71) Applicant: GlobTek, Inc., Northvale, NJ (US)

(72) Inventor: David R. Love, Randolph, NJ (US)

(73) Assignee: GlobTek, Inc., Northvale, NJ (US)

( * ) Notice: Subject to any disclaimer, the term of this patent is extended or adjusted under 35 U.S.C. 154(b) by 254 days.

(21) Appl. No.: 14/918,863

(22) Filed: Oct. 21, 2015

(65) Prior Publication Data

US 2017/0118030 A1    Apr. 27, 2017

(51) Int. Cl.
| H04L 12/10 | (2006.01) |
| G06F 1/32 | (2006.01) |
| G06F 1/26 | (2006.01) |

(52) U.S. Cl.
CPC .............. H04L 12/10 (2013.01); G06F 1/266 (2013.01); G06F 1/3209 (2013.01); G06F 1/3243 (2013.01)

(58) Field of Classification Search
CPC ......... G06F 1/266; G06F 1/3243; H04L 12/10
See application file for complete search history.

(56) References Cited

U.S. PATENT DOCUMENTS

| 2006/0173581 A1* | 8/2006 | Elkayam | ................. | G06F 1/305 |
| | | | | 700/286 |
| 2007/0133238 A1* | 6/2007 | Herbold | ................. | H04L 12/10 |
| | | | | 363/63 |
| 2011/0154086 A1 | 6/2011 | Picard et al. | | |
| 2013/0076133 A1 | 3/2013 | Gammel et al. | | |
| 2014/0164795 A1 | 6/2014 | Wright et al. | | |
| 2015/0277522 A1 | 10/2015 | Kao et al. | | |

FOREIGN PATENT DOCUMENTS

WO    WO 2015-118300 A1    8/2015

OTHER PUBLICATIONS

International Search Report for Int. App. No. PCT/US2016/057823, dated Oct. 20, 2016 (12 pages).
Globtek.com [online]. "Power over Ethernet, PoE Injectors Desktop Wall Plug-in 0-50w," Jan. 1, 2008, [retrieved on Oct. 19, 2015]: URL http://en.globtek.com/power-over-ethernet/poe-injectors-desktop-wall-plug-in-0-50w (2 pages).
Globtek.com [online]. "Power over Ethernet, PoE Active Injector 48V," Jan. 1, 2008, [retrieved on Oct. 19, 2015]: URL http://en.globtek.com/power-over-ethernet/power-over-ethernet-poe-active (2 pages).

(Continued)

*Primary Examiner* — Albert Wang
(74) *Attorney, Agent, or Firm* — Fish & Richardson P.C.

(57) ABSTRACT

A Power over Ethernet (PoE) system and method that can provide greater power efficiency and reduces greenhouse gas emissions is described. The PoE system includes power supply equipment, Ethernet cabling, and a powered device. When a load is not present at the end of the Ethernet cabling, an injector in the power supply equipment enters a sleep state, thus conserving power and increasing efficiency. When the injector is electrically connected to a load, such as the powered device, a circuit in the injector activates power to a digital control logic and subsequently provides power to a sensing conductor in the Ethernet cable, thereby enabling high efficiency power transfer.

20 Claims, 5 Drawing Sheets

(56) References Cited

OTHER PUBLICATIONS

Microsemi, "Understanding 802.3at PoE Plus Standard Increases Available Power" (Jun. 2011) (7 pages).

IEEE Computer Society, IEE Standard 802.3af-2003, Part 3: "Carrier Sense Multiple Access with Collision Detection (CSMA/CD) Access Method and physical Layer Specifications, Amendment: Data Terminal Equipment (DTE) Power via Media Dependent Interface (MDI)," Jun. 18, 2003 (133 pages).

\* cited by examiner

BASIC POWER INITIATION STATES

| State 1 | No PD on end of cable, 40-60Vdc present on P1. No voltage present on P2. U1 and U2 in "OFF" state, conserving power. |
|---|---|
| State 2 | A PD is attached to end of cable, current will flow back on P2, since pins 1 & 2 will be electrically "common" in the PD. |
| State 3 | The voltage present on P2 activates Power Gate U1 and Digital PoE Controller U2, this in turn activates Q3 and Q2. Thus allowing maximum power transfer on P1 and P2. |

BASIC POWER DISCONNECT STATES

| State 3 | Q2 & Q3 are on, maximum power transfer capability state. |
|---|---|
| State 4 | PD is disconnected from the end of the cable, U1 digital controller recognizes condition, and removed drive signal to Q3 and Q2. |
| State 1 | Voltage on P2 drops to zero, this in turn shuts off U2 (Power Gate) and U1 (Digital PoE controller). |

FIG. 5

POWER OVER ETHERNET DELIVERY METHOD AND SYSTEM

FIELD

This disclosure generally relates to delivering power over the Ethernet.

BACKGROUND

To combat problems with the supply of alternative current (AC) power in certain locations, a method of providing direct current (DC) power over the Ethernet was developed. However, Power over Ethernet (PoE) systems sometimes suffer from power delivery inefficiencies, require additional interface circuitry to extend the DC power supply over long cable lengths, and can undesirably generate greenhouse gases as a by-product of low-power supply energy use efficiency.

SUMMARY

Various aspects of the disclosure are set forth in the claims and example implementations are described in greater detail below.

In general, techniques are described that, in some implementations, can help reduce power consumption and can help provide a substantial improvement in power efficiency relative to existing PoE systems. For example, in one aspect, the disclosure describes a Power over Ethernet apparatus that includes a plurality of conductive terminals, a controller, and a power gate. The plurality of conductive terminals is connected electrically to a powered device in a first mode and disconnected electrically from the powered device in a second mode. The plurality of conductive terminals includes at least a first terminal configured to provide a first voltage to the powered device and a second terminal. The controller is activated in response to receiving a first power signal from the powered device through the second terminal in the first mode. The controller provides a return voltage to the powered device through the second terminal in the first mode, and is deactivated in the second mode. The power gate is connected electrically to the second terminal and the controller. The power gate activates the controller in the first mode in response to receiving the first power signal from the powered device through the second terminal. The power gate is deactivated in the second mode.

In another aspect, the disclosure describes a Power over Ethernet system that includes a power supply, an Ethernet cable system, and an Ethernet injector. The power supply provides a plurality of voltage outputs. The Ethernet cable system includes a plurality of conductive terminals connected electrically to a powered device in a first mode and disconnected electrically from the powered device in a second mode. The plurality of conductive terminals includes at least a first terminal configured to provide a first voltage from the power supply to the powered device and a second terminal. The Ethernet injector includes a controller and a power gate. The controller is activated in response to receiving a first power signal from the powered device through the second terminal in the first mode, and provides a return voltage to the powered device through the second terminal in the first mode. The controller is deactivated in the second mode. The power gate is connected electrically to the second terminal and the controller. The power gate activates the controller in the first mode in response to receiving the first power signal from the powered device through the second terminal. The power gate is deactivated in the second mode.

Some implementations can include one or more of the following features.

For example, in some implementations, the power supply in the Power over Ethernet apparatus or system provides a second voltage and a third voltage to the power gate, and provides the first voltage to the powered device through the first terminal and the second terminal in the first mode.

In some implementations, the Power over Ethernet apparatus or system includes a bypass switch, a driver switch, and a third switch. The bypass switch is connected electrically between the first terminal and the second terminal. The bypass switch operates in a closed state in the first mode and in an open state in the second mode. The bypass switch provisions, in the closed state, current flow from the power supply to the first terminal and second terminal. The driver switch is connected electrically between the controller and the bypass switch. The driver switch operates in a closed state in response to being activated by the controller in the first mode and operates in an open state in the second mode. The third switch is coupled to the plurality of conductive terminals and to the controller. The third switch operates in an open state in the second mode and operates in a closed state in the first mode to connect the powered device to a current monitoring circuit.

In some implementations, the controller includes a digital power management controller, and the plurality of terminals includes at least eight terminals in an Ethernet cable extending from the power supply to the powered device.

In some implementations, the power supply is configured to receive an alternative current input and provide at least three direct current outputs that include the first voltage, the second voltage, and the third voltage. The second voltage is smaller than the first voltage, and the third voltage is smaller than the second voltage and smaller than the first voltage.

In some implementations, the first voltage is a voltage having a value in a range of 40V to 60V, the second voltage is a voltage having a value in a range of 6V to 25V, and the third voltage is a voltage having a value in a range of 3V-10V.

In some implementations, in the first mode, a conductive path through the plurality of terminals and the powered device is a closed loop path. In the second mode, a conductive path through the plurality of terminals and the powered device is an open loop path.

In some implementations, a ratio of a power consumed by the Power over Ethernet apparatus or power injector in the first mode to a power consumed by the Power over Ethernet apparatus or power injector in the second mode is at least 10.

In some implementations, the bypass switch includes a p-channel field effect transistor or a bipolar junction transistor. The driver switch includes a p-channel field effect transistor or a bipolar junction transistor. The third switch includes an n-channel metal oxide semiconductor field effect transistor. The powered device includes a Power over Ethernet splitter.

In some implementations, a method is disclosed. The method includes directly connecting a first terminal and a second terminal of an Ethernet cable to a powered device, providing a first voltage to the powered device through the first terminal, receiving a power signal from the powered device through the second terminal, activating a power gate and a controller in response to receiving the power signal from the powered device through the second terminal, providing a return voltage to the powered device through the second terminal, disconnecting the Ethernet cable from the powered device, and deactivating the power gate and the controller in response to disconnecting the Ethernet cable from the powered device.

In some implementations of the method, a ratio of power consumed when the powered device is connected to the Ethernet cable to power consumed when the powered device is not connected to the Ethernet cable is at least 10.

Other embodiments of the above-noted implementations include corresponding systems, apparatus, computers, non-transitory computer-readable storage mediums, and/or computer programs.

The details of one or more implementations are set forth in the accompanying drawings and the description below. Other features and advantages will become apparent from the description, the drawings, and the claims.

BRIEF DESCRIPTION OF THE DRAWINGS

FIG. 5 depicts an example implementation of a state diagram of the Power over Ethernet system.

DETAILED DESCRIPTION

In general, Power over Ethernet (PoE) systems can be utilized to provide electrical power and data through Ethernet cables over long distances (e.g., 100 m). Institute of Electrical and Electronics Engineers (IEEE) 802.3 PoE standards have been developed to standardize implementation of PoE systems in power networks. However, as noted above, PoE systems sometimes suffer from power delivery inefficiencies and undesirably generate greenhouse gases. Implementations disclosed below address these deficiencies and describe a PoE system with an Ethernet injector that provides improved power efficiency and delivery to a powered device.

Figure 1:
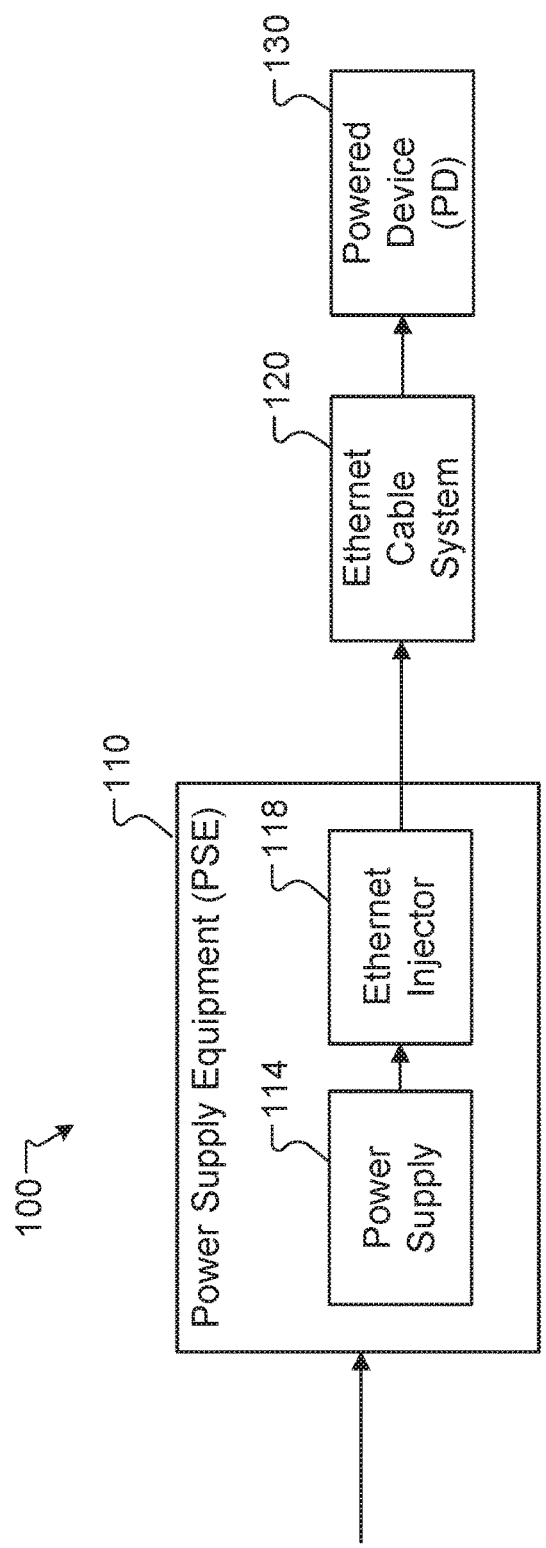
FIG. 1 depicts an example implementation of a Power over Ethernet system.

FIG. 1 depicts an example of a Power over Ethernet (PoE) system 100. The PoE system 100 includes power supply equipment (PSE) 110, Ethernet Cable System 120, and a powered device (PD) 130.

A PoE system 100 can be implemented in a power network to provide power to a remote powered device 100. Examples of a powered device (PD) 130 include, but are not limited to, Voice over Internet Protocol (VoIP) phones, splitters, IP cameras, wireless access points, and network routers. In general, the powered device (PD) 130 can be any suitable electronic device residing on the power network that is capable of receiving data and electrical power using an Ethernet Cable System 120. A powered device (PD) 130 can represent a load on the Ethernet Cable System 120. In some implementations, the powered device (PD) 130 can be coupled to other electronic devices, such as cameras and network access points, to transmit or receive data or power to the other devices. Powered devices 130 can be distributed at various points on the power network.

The power network can include one or more Ethernet-based networks that include wired or wireless networks, e.g., a local area network (LAN), a wide area network (WAN), implementing one or more network architectures such as Worldwide Interoperability for Microwave Access (Wi-MAX) and Wireless Fidelity (WiFi).

The Power Supply Equipment (PSE) 110 includes a power supply 114 and an Ethernet injector 118. The PSE 110 can be implemented at various suitable locations of a power network. In some cases, the PSE 110 can be implemented at a midspan location between, for example, a switch/hub (e.g., a data terminal equipment or repeater) and an end station of the power network. In some cases, the PSE 110 can be implemented at an endspan location, for example, in a switch/hub of the power network.

As explained below, the PSE 110 can detect when a powered device (PD) 130 is connected or disconnected to the Ethernet Cable System 120. In some implementations, the PSE 110 can determine a type of link with the PD 130 and the amount of power to be supplied to the PD 130. Based on the determination, the PSE 110 can adjust the power supplied to a PD 130. This determination allows the PSE 110 to support provision of power to a variety of PDs 130 across different types of cables. The PSE 110 can also monitor an amount of power supplied to a PD 130, and adjust the power supplied as desired.

The power supply 114 in the PSE 110 provides one or more Direct Current (DC) voltages to the Ethernet Cable System 120. The power supply 114 can include various power circuit elements such as diodes, resistors, transistors, inductors, conductive wires, and capacitors in various suitable combinations. For example, in some implementations, the power supply 114 can include an alternative current (AC)-to-DC converter to convert an AC input signal to one or more DC output signals. In some implementations, the power supply 114 can include a DC-to-DC unit to receive a DC input signal and provide one or more DC output signals.

The power supply 114 can be configured to receive and provide various suitable voltages. In some cases, the power supply 114 can receive one or more of an AC input signal and a DC input signal. The input to the power supply 114 can have various suitable voltages (e.g., 3.3 volts (V), 3.6V) and frequencies. In some cases, the power supply 114 can generate multiple DC voltages having different values. For example, the power supply 114 can provide a first output voltage in a range of 40-60V, a second output voltage in a range of 6-25V, and a third voltage output in a range of 3-10V.

Figure 2:
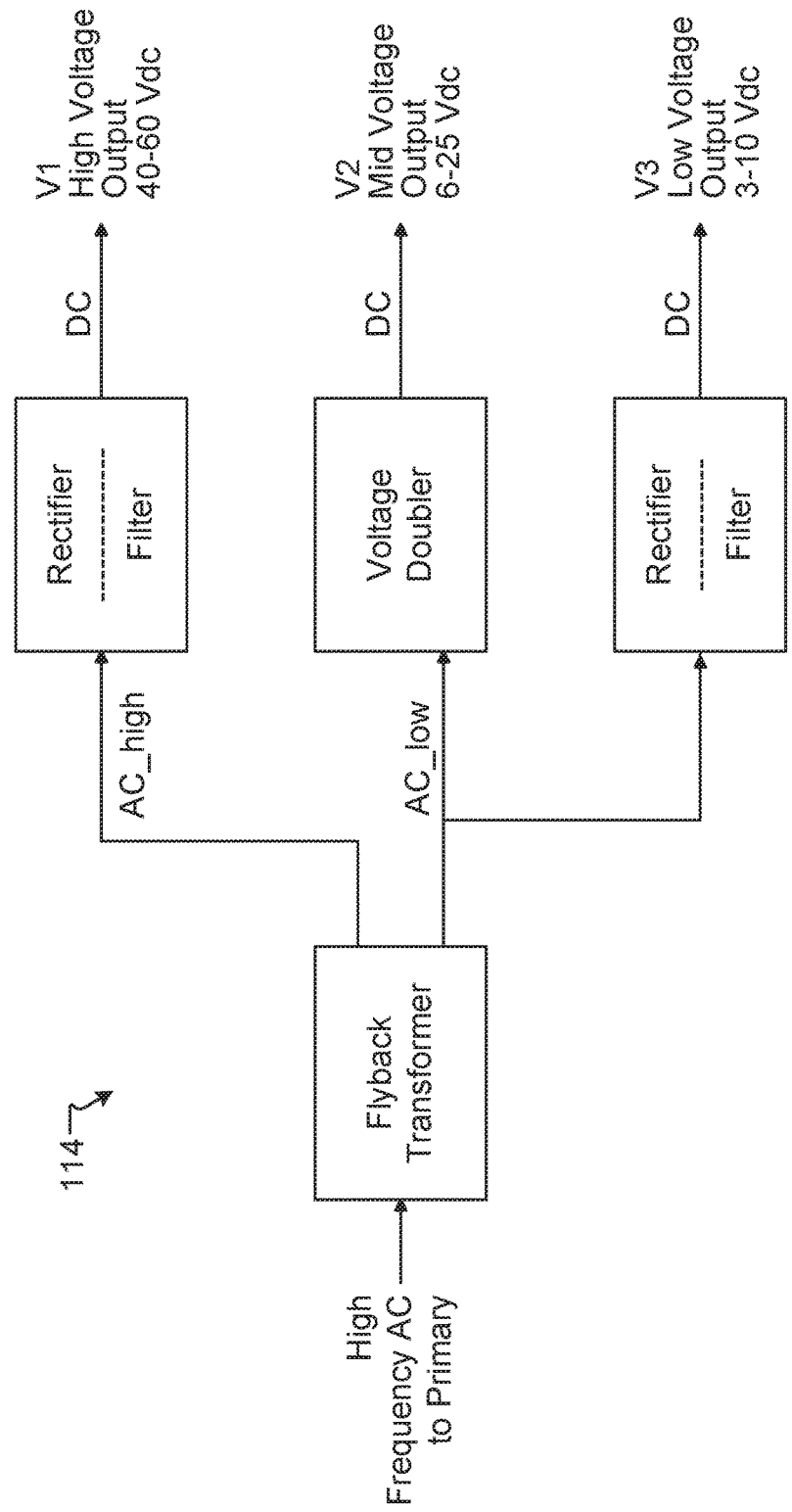
FIG. 2 depicts an example implementation of a power supply in the Power over Ethernet system.

FIG. 2 illustrates an example implementation of a power supply 114. The power supply 114 includes a flyback transformer that receives a high frequency alternative current (AC) input. For example, the AC input can have a frequency in the range of 29 KHz to 500 KHz. The flyback transformer can generate multiple AC output signals that are provided as inputs to one or more secondary components. The secondary components can include a rectifier, a doubler, and a filter. The secondary components perform AC to DC voltage conversion.

As shown in FIG. 2, a low voltage signal AC_low generated by the flyback transformer is supplied to a voltage doubler and a rectifier. The rectifier converts the low voltage AC signal AC_low to a low voltage DC signal. An output of the rectifier can be filtered to generate a smooth, low voltage DC signal V3. The low voltage DC signal V3 can have a voltage in the range of, for example, 3-10V. The voltage doubler receives the low voltage AC signal AC_low provided by the flyback transformer and generates a second DC signal V2 at approximately twice the voltage of the low voltage AC signal. The second DC signal V2 can have a medium voltage output in the range of, for example, 6-25V. The flyback transformer also outputs a high voltage AC signal AC_high, which is received by a rectifier and converted to a DC signal. The high voltage DC signal is filtered to generate a smooth, high voltage DC signal V3. The high voltage DC signal V3 can have a voltage in the range of, for example, 40-60V. Accordingly, the power supply 114 can receive a high frequency AC signal and generate three DC output signals at a low voltage V3, a medium voltage V2, and a high voltage V1.

The power supplied by the power supply 114 is received by the injector 118 and the Ethernet Cable System 120, and can be delivered to the powered device (PD) 130. An Ethernet cable in the Ethernet Cable System 120 can connect the power supply 114 to a plurality of devices including the powered device (PD) 130. The plurality of devices can include, for example, network access points, routers, Ethernet repeaters, and Ethernet extenders. In some implementations, at least some of the plurality of devices can be situated at locations where AC power cannot be provided or is difficult to provide.

The Ethernet Cable System 120 can include various power circuit elements such as switches, transistors, capacitors, resistors, and conductive wires in various suitable combinations. In addition, various suitable types of Ethernet cables can be used. For example, in some cases, a category 5 or category 6 cable can be used to connect the PSE 110 to the PD 130. The Ethernet Cable System 120 can include one or more of 10BASE-T, 100BASE-TX, 1000BASE-T, 1000BASE-TX, and 10GBASE-T Ethernet cable networks to deliver power and data to the powered device (PD) 130.

The Ethernet Cable System 120 can include a plurality of terminals that electrically connect the Ethernet Cable System 120 to the powered device (PD) 130. In some implementations, an Ethernet cable of the Ethernet Cable System 120 can include eight or more terminals. The terminals can be arranged in pairs.

Pairs of terminals in the Ethernet cable can be electrically connected to the powered device (PD) 130 such that at least one of the pairs of terminals provides power to the powered device (PD) 130. For example, in some implementations, two pairs of terminals are used to transceive power between the PSE 110 and the PD 130, while one or more of the remaining terminals can be used to transceive data. While the figures show power being transceived through terminals 1-4, it should be understood that various other suitable combinations of terminal connections can be used. For example, in some cases, terminals 1, 2, 3, and 6 can be used to transceive power, and, in some cases, terminals 4, 5, 7, and 8 can be used to transceive power. In some cases in which more power is delivered to the PD 130, all 8 terminals can be used for power transmission.

In some implementations, a first terminal of a particular terminal pair can supply power to the powered device (PD) 130 and a second terminal of the particular terminal pair can receive power from the powered device (PD) 130. The second terminal pair can subsequently provide a return voltage to the powered device (PD) 130 as described in further detail below. The power supplied to the powered device (PD) 130 can be provided through the first terminal pair, which receives the high voltage DC signal V1 from the power supply 114.

In some implementations, two terminals of a terminal pair can be connected through a single wire for power transmission. In some implementations, two terminals of a terminal pair can use more than one wire for power transmission. In general, the terminal pairs of the Ethernet cable can be connected in various suitable manners and can be made of various suitable materials.

Figure 3:
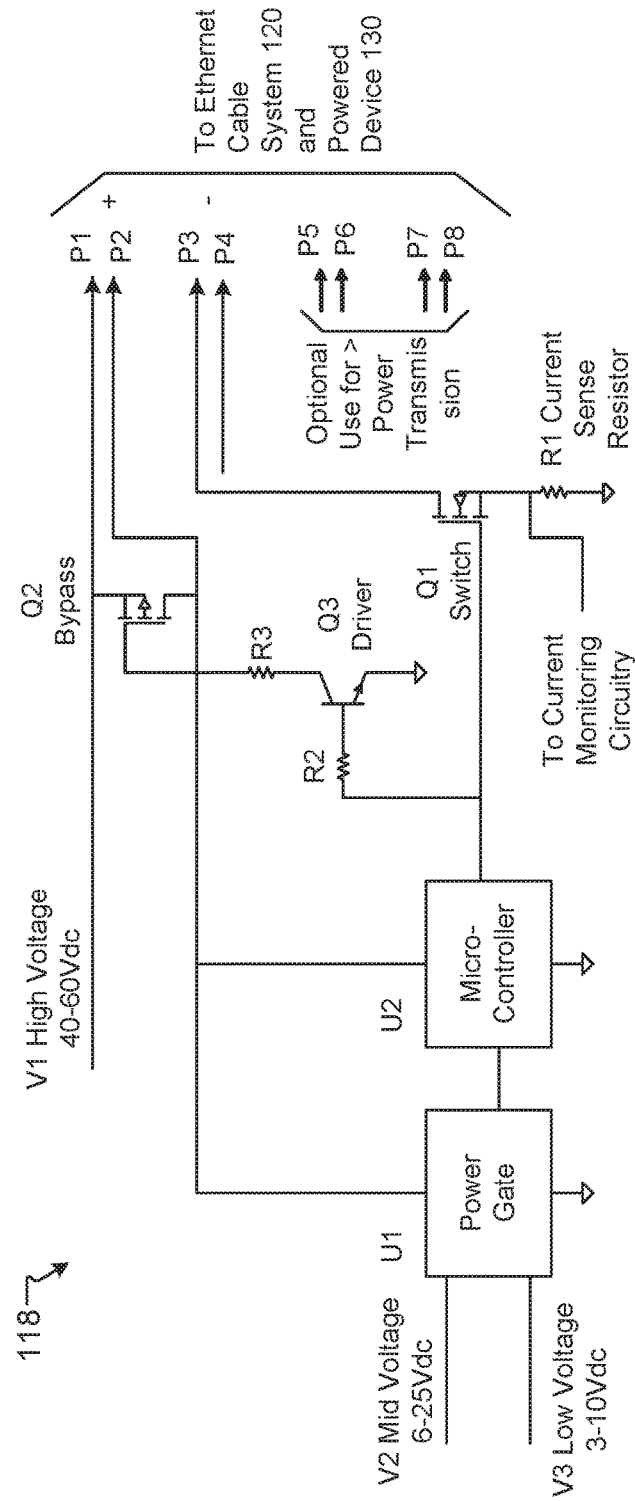
FIG. 3 depicts an example implementation of an injector in the Power over Ethernet system.

Referring to FIG. 1, the Power Supply Equipment (PSE) 110 also includes an Ethernet injector 118, an example implementation of which is shown in FIG. 3. The injector 118 can include, among other elements, a power gate U1, a microcontroller U2, a switch Q1, a bypass switch Q2, a driver switch Q3, and current monitoring circuitry.

The injector 118 regulates DC voltage supplied to the Ethernet Cable System 120 to power a powered device (PD) 130. When a PD 130 is connected to the Ethernet Cable System 120, the injector 118 can detect a change in the load of the Ethernet Cable System 120 and in current-voltage characteristics of the Ethernet Cable System 120 to determine that a PD 130 has been connected. In some implementations, based on the detected current-voltage characteristics, the injector 118 can classify the PD 130 into one of several power classes. For example, a PD 130 can be classified as a particular class PD (e.g., class 1) if the current-voltage characteristics associated with the connected PD 130 is below a particular power threshold. In some cases, a PD 130 can be classified as a particular class PD (e.g., class 4) if the current-voltage characteristics associated with the connected PD 130 is above a particular power threshold. Accordingly, the injector 118 can detect the connection with a PD 130 and subsequently classify the PD 130 to determine the power characteristics associated with the connected PD 130.

The injector 118 includes a power gate U1, which is electrically connected to the microcontroller U2, the bypass switch Q2, the Ethernet cable, and the power supply 114. The power gate U1 can include various suitable power circuit elements, such as resistors, transistors, etc., in various suitable configurations. For example, the power gate U1 can include a p-type Field Effect Transistor (pFET) and a n-type FET (nFET), which receive the medium voltage DC signal V2 and the low voltage DC signal V3, respectively, that are supplied by the power supply 114. Supply of the low and medium voltage DC signals V2 and V3 to the power gate U1 in the injector 118 helps improve energy use efficiency of the PSE 110 when the PSE 110 and Ethernet Cable System 120 are connected to the PD 130.

When the Ethernet cable in the Ethernet Cable System 120 is connected to the powered device (PD) 130, the power gate U1 can receive a DC power signal from the powered device (PD) 130 through one terminal (e.g., P2) of a particular terminal pair in the Ethernet cable. After receiving the DC power signal from the powered device (PD) 130 and detecting a connection with the PD 130 as described above, the power gate U1 generates a signal to activate the microcontroller U2. When a DC power signal from the powered device (PD) 130 is not received, the power gate U1 can deactivate the microcontroller U2.

The microcontroller U2 can also receive a DC power signal from the powered device (PD) 130 through the one terminal (e.g., P2) of the particular terminal pair in the Ethernet cable. After being activated by the received DC power signal, the microcontroller U2 can activate the driver switch Q2 and the bypass switch Q3 thereby enabling terminals P1 and P2 to provide maximum power transmission (e.g., high voltage DC signal V1 from the power supply 114) to the powered device (PD) 130.

The microcontroller U2 can include various suitable power circuit elements, such as resistors, transistors, etc. In some implementations, the microcontroller U2 is a Si3462 PoE controller.

When activated, the microcontroller U2 also generates a signal to activate switch Q1. After being activated, switch Q1 can operate in a closed state and can connect one or more terminals of the Ethernet cable other than the particular terminal pair to a particular node, such as a grounding node or current monitoring circuitry.

The current monitoring circuitry can include a current sensing resistor R1 or shunt resistor, and additional circuitry which can measure the amount of drain-source current at switch Q1. The current monitoring circuitry includes a feedback circuit, which, based on the measured current, can transmit a signal to the microcontroller U2. If the current monitoring circuitry determines that the measured current is more or less than a desired level, the current monitoring circuitry can transmit a signal to the microcontroller U2 to adjust (e.g., increase or decrease) the power supplied to the PD 130 so that the desired level of current and power is sustained. When deactivated, the switch Q1 can operate in an open state. In the open state of the switch Q1, the particular node, such as the grounding node or current monitoring circuitry, can be electrically disconnected from terminals of the Ethernet cable.

The switch Q1 can be implemented using various suitable devices. In some implementations, a n-type metal oxide semiconductor field effect transistor (MOSFET) can be implemented as the switch Q1. However, other types of transistors and switches also can be used.

As noted above, the bypass switch Q2 can be electrically connected to a first terminal and a second terminal of a particular terminal pair of the Ethernet cable. In some implementations, the bypass switch Q2 can include a p-channel MOSFET. However, other types of transistors and switches such as bipolar junction transistors (BJTs) also can be used.

When the Ethernet cable is disconnected from the powered device (PD) 130, the bypass switch Q2 operates in an open state. A high voltage DC signal V1 is supplied to terminal P1, and no DC power signal is received by the power gate U1 and microcontroller U2 from the PD 130. When the Ethernet cable is connected to the powered device (PD) 130, the voltage across terminals P1 and P2 is common and the power gate U1 and microcontroller U2 are activated, which results in activation of the bypass switch Q2 and driver switch Q3. Bypass switch Q2 operates in a closed state.

Driver switch Q3 is connected to switch Q1, resistor R3, bypass switch Q2, resistor R2, and microcontroller U2. Driver switch Q3 can be activated when the microcontroller U2 is activated after connection of the PD 130 to the Ethernet Cable System 120. Upon activation, driver switch Q3 operates in a closed state, which results in activation of the bypass switch Q2. In some implementations, the driver switch Q3 can include a n-channel MOSFET. However, other types of transistors and switches such as bipolar junction transistors (BJTs) also can be used.

According to the above-described configuration of the injector 118, the power gate U1, microcontroller U2, and switches Q1, Q2, and Q3 are activated when the powered device (PD) 130 is connected to the Ethernet Cable System 120, and deactivated when the PD 130 is disconnected from the Ethernet Cable System 120. As a result of the deactivation of several components in the injector 118, the power consumption of the PoE system 100 reduces, in some cases, by a factor of ten or more. For example, in some instances, when the Ethernet cable is connected to the powered device (PD) 130, the overall power consumption can be approximately 1,000 mW. When the Ethernet cable is disconnected from the powered device (PD) 130, the overall power consumption can be less than approximately 100 mW. The reduction in power consumption when the powered device (PD) 130 is disconnected provides a substantial improvement in power efficiency relative to existing PoE systems and consequently a reduction in the emission of greenhouse gases.

Although use of terminals P1-P4 have been described above, it should be appreciated that if more power transmission to the PD 130 is desired, additional terminals, such as terminals P5-P8, can be utilized to deliver additional power to the PD 130.

Figure 4:
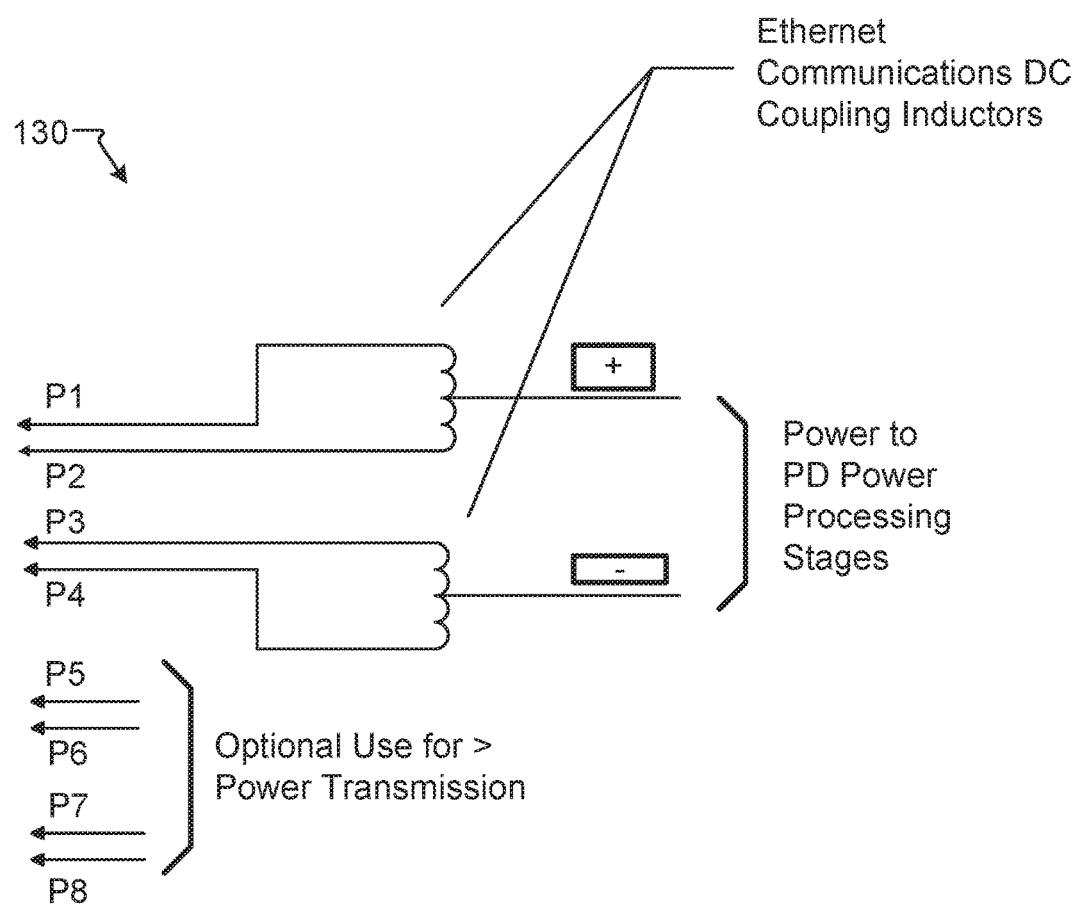
FIG. 4 depicts an example implementation of inductance in a powered device in the Power over Ethernet system.

FIG. 4 illustrates the configuration of terminals P1-P8 in a powered device (PD) 130. Each terminal of a terminal pair in the PD 130 is connected through an inductor to the other terminal of the terminal pair. For example, terminal P1 is connected to terminal P2 through an inductor, and terminal P3 is connected to terminal P4 through an inductor. The inductors between the terminal pairs in the PD 130 can be coupled inductors and can create a DC coupling inductance between terminal pairs, as shown in FIG. 4. The voltage generated at the terminals as a result of the connection with the Ethernet Cable System 120 and through coupling inductance can be stored and provided to subsequent processing stages in the PD 130, which can include any suitable electronic component. Although not shown, it should be understood that the configuration in terminals P5-P8 and any additional terminals can be similar to the configuration of terminals P1-P4 shown in FIG. 4.

Various components of the PoE system have been described above. Modes of operation and state diagrams associated with the PoE system 100 are described below.

In one mode of operation, a powered device (PD) 130 is connected to an Ethernet Cable System 120. In particular, a plurality of terminals arranged in terminal pairs in an Ethernet cable of the Ethernet Cable System 120 are connected to ports of the powered device (PD) 130.

A first terminal of at least one pair of the terminals pairs provides a first DC voltage supplied, for example, by the power supply 114 to the powered device (PD) 130. A second terminal of the at least one pair of the terminal pairs receives a DC power signal from the powered device (PD) 130. This DC power signal activates the power gate U1 and microcontroller U2 in a PoE injector 118 of the Ethernet Cable System 120. Upon activation, the microcontroller U2 generates a return voltage applied through the second terminal of the at least one terminal pair. The first and second terminal of the at least one pair of the terminal pairs can have a common voltage and can receive current flow from a node receiving the high voltage DC signal V1 from the power supply 114.

Upon activation, the microcontroller U2 also activates a switch Q1 which then connects the powered device (PD) 130 to a particular node, such as a grounding node or current monitoring circuitry. The current monitoring circuitry can measure the current across switch Q1 and can determine if the power transmitted to powered device (PD) 130 should be adjusted. If an adjustment is needed, a feedback signal is transmitted from the current monitoring circuit to the microcontroller U2, which can tune the current and voltage applied to the PD 130 to adjust the transmission power.

In another mode of operation, the powered device (PD) 130 is disconnected from the Ethernet Cable System 120. When the powered device (PD) 130 is disconnected from the Ethernet system, a bypass switch Q2 between the first and second terminals of the at least one pair of the terminal pairs is in an open state, and the power gate U1, microcontroller U2, and switch Q1 are deactivated. As a result, the power consumption of the Ethernet system reduces, in some implementations, by a factor of ten or more. The reduction in power consumption when the powered device (PD) 130 is disconnected (i.e., no load on the Ethernet Cable System 120) can provide a substantial improvement in power efficiency relative to existing PoE systems.

A state diagram of the PoE system 100 is described with respect to FIG. 5 to further facilitate understanding of the operations of the PoE system 100.

In the first state, the PSE 110 and Ethernet Cable System 120 are disconnected from the PD 130. A high voltage DC signal V1 is supplied to terminal P1. No voltage is received from the PD 130 on terminal P2 and voltage at terminal P2 is negligible. The power gate U1 and microcontroller U2 are deactivated or in an OFF state.

In the second state, the PD 130 is attached to an end of the Ethernet cable in the Ethernet Cable System 120. A return signal is provided from PD 130 through terminal P2, and terminals P1 and P2 are electrically common.

In the third state, the return signal provided from PD 130 and common voltage at terminal P2 activates power gate U1 and microcontroller U2. The activation of power gate U1 and microcontroller U2 in turn activates bypass switch Q2 and driver switch Q3. Activation of switches Q2 and Q3 allows maximum power to be transferred on terminals P1 and P2.

In the fourth state, the PD 130 is disconnected from the Ethernet Cable System 120 and the PSE 110. After the fourth state, the PoE system 100 returns to the first state in which the power gate U1, microcontroller U2, and switches Q2 and Q3 are deactivated.

As can be appreciated from the foregoing, an improved PoE method and system for delivering power over the Ethernet is described. According to the foregoing example implementations, power efficiency in a no load state (i.e., no powered device (PD) 130 connected) improves, in some cases, by a factor of greater than at least ten times. Additional advantages of improved average power efficiency and reduced power consumption also can be obtained in some instances. The combination of greater efficiency and reduced power consumption also provides a benefit of reducing greenhouse gas emissions and the negative environmental footprint of Ethernet-based network systems.

Embodiments and all of the functional operations and/or actions described in this specification can be implemented, for example, through combinations of one or more digital electronic circuitry, computer software, firmware, or hardware, including the structures disclosed in this specification and their structural equivalents. Certain embodiments can be implemented using one or more computer program products, e.g., one or more modules of computer program instructions encoded on a computer readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

While this specification contains many specifics, these should not be construed as limitations on the scope of the disclosure or of what can be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

A person of ordinary skill in the art can appreciate that knowledge of Ethernet systems, Institute of Electrical and Electronics Engineers (IEEE) 802.3 PoE standards, power supply equipment (e.g., injectors), and PoE splitters (e.g., powered device) can facilitate further understanding of the disclosure. Aspects of PoE systems that are not related to innovative aspects of the implementations described herein have not been described in detail.

Although actions are described as occurring in a particular order, such actions are not required in all cases to be performed in the particular order shown or in sequential order, or that all illustrated actions be performed, to achieve desirable results. Moreover, the separation of various system components in the implementations described above should not be understood as requiring such separation in all implementations, and it should be understood that the described components and systems can generally be integrated together in a single element or product, or packaged into multiple products.

Thus, although particular implementations have been described, various modification may be made. Accordingly, other implementations are within the scope of the following claims.

What is claimed is:

1. A Power over Ethernet apparatus comprising:
a plurality of conductive terminals operable to be connected electrically to a powered device in a first mode and operable to be disconnected electrically from the powered device in a second mode, the plurality of conductive terminals including at least a first terminal configured to provide a first voltage to the powered device and a second terminal;
a controller operable to be activated in response to receiving a first power signal from the powered device through the second terminal in the first mode, operable to provide a return voltage to the powered device through the second terminal in the first mode, and operable to be deactivated in the second mode; and
a power gate connected electrically to the second terminal and the controller, the power gate being operable to activate the controller in the first mode in response to receiving the first power signal from the powered device through the second terminal, and operable to be deactivated in the second mode.

2. The Power over Ethernet apparatus of claim 1, further comprising:
a power supply to provide a second voltage and a third voltage to the power gate, and to provide the first voltage to the powered device through the first terminal and the second terminal in the first mode.

3. The Power over Ethernet apparatus of claim 1, further comprising:
a bypass switch connected electrically between the first terminal and the second terminal, the bypass switch operating in a closed state in the first mode and in an open state in the second mode, the bypass switch provisioning, in the closed state, current flow from the power supply to the first terminal and second terminal;
a driver switch connected electrically between the controller and the bypass switch, the driver switch operating in a closed state in response to being activated by the controller in the first mode and operating in an open state in the second mode; and
a third switch coupled to the plurality of conductive terminals and to the controller, wherein the third switch operates in an open state in the second mode and operates in a closed state in the first mode to connect the powered device to a current monitoring circuit.

4. The Power over Ethernet apparatus of claim 2, wherein:
the controller comprises a digital power management controller; and
the plurality of terminals comprises at least eight terminals in an Ethernet cable extending from the power supply to the powered device.

5. The Power over Ethernet apparatus of claim 2, wherein:
the power supply is configured to receive an alternative current input and provide at least three direct current outputs that include the first voltage, the second voltage, and the third voltage;
the second voltage is smaller than the first voltage; and
the third voltage is smaller than the second voltage and smaller than the first voltage.

6. The Power over Ethernet apparatus of claim 5, wherein the first voltage is a voltage having a value in a range of 40V to 60V, the second voltage is a voltage having a value in a range of 6V to 25V, and the third voltage is a voltage having a value in a range of 3V-10V.

7. The Power over Ethernet apparatus of claim 1, wherein:
in the first mode, a conductive path through the plurality of terminals and the powered device is a closed loop path; and
in the second mode, a conductive path through the plurality of terminals and the powered device is an open loop path.

8. The Power over Ethernet apparatus of claim 1, wherein a ratio of a power consumed by the Power over Ethernet apparatus in the first mode to a power consumed by the Power over Ethernet apparatus in the second mode is at least 10.

9. The Power over Ethernet apparatus of claim 3, wherein:
the bypass switch comprises a p-channel field effect transistor or a bipolar junction transistor;
the driver switch comprises a p-channel field effect transistor or a bipolar junction transistor;
the third switch comprises an n-channel metal oxide semiconductor field effect transistor; and
the powered device comprises a Power over Ethernet splitter.

10. A Power over Ethernet system comprising:
a power supply to provide a plurality of voltage outputs;
an Ethernet cable system comprising a plurality of conductive terminals operable to be connected electrically to a powered device in a first mode and operable to be disconnected electrically from the powered device in a second mode, the plurality of conductive terminals including at least a first terminal configured to provide a first voltage from the power supply to the powered device and a second terminal; and
an Ethernet injector comprising:
a controller operable to be activated in response to receiving a first power signal from the powered device through the second terminal in the first mode, operable to provide a return voltage to the powered device through the second terminal in the first mode, and operable to be deactivated in the second mode; and
a power gate connected electrically to the second terminal and the controller, the power gate being operable to activate the controller in the first mode in response to receiving the first power signal from the powered device through the second terminal, and operable to be deactivated in the second mode.

11. The Power over Ethernet system of claim 10, wherein the power supply is operable to provide a second voltage and a third voltage to the power gate, and to provide the first voltage to the powered device through the first terminal and the second terminal in the first mode.

12. The Power over Ethernet system of claim 10, wherein the Ethernet injector further comprises:
a bypass switch connected electrically between the first terminal and the second terminal, the bypass switch operating in a closed state in the first mode and in an open state in the second mode, the bypass switch provisioning, in the closed state, current flow from the power supply to the first terminal and second terminal;
a driver switch connected electrically between the controller and the bypass switch, the driver switch operating in a closed state in response to being activated by the controller in the first mode and operating in an open state in the second mode; and
a third switch coupled to the plurality of conductive terminals and to the controller, wherein the third switch operates in an open state in the second mode and operates in a closed state in the first mode to connect the powered device to a current monitoring circuit.

13. The Power over Ethernet system of claim 10, wherein:
the controller comprises a digital power management controller; and
the plurality of terminals comprises at least eight terminals in an Ethernet cable extending from the power supply to the powered device.

14. The Power over Ethernet system of claim 11, wherein:
the power supply is configured to receive an alternative current input and provide the first voltage, the second voltage, and the third voltage;
the second voltage is smaller than the first voltage; and
the third voltage is smaller than the second voltage and smaller than the first voltage.

15. The Power over Ethernet system of claim 14, wherein the first voltage is a voltage having a value in a range of 40V to 60V, the second voltage is a voltage having a value in a range of 6V to 25V, and the third voltage is a voltage having a value in a range of 3V-10V.

16. The Power over Ethernet system of claim 10, wherein:
in the first mode, a conductive path through the plurality of terminals and the powered device is a closed loop path; and
in the second mode, a conductive path through the plurality of terminals and the powered device is an open loop path.

17. The Power over Ethernet system of claim 10, wherein a ratio of a power consumed by the Ethernet injector in the first mode to a power consumed by the Ethernet injector in the second mode is at least 10.

18. The Power over Ethernet system of claim 12, wherein:
the bypass switch comprises a p-channel field effect transistor or a bipolar junction transistor;
the driver switch comprises a p-channel field effect transistor or a bipolar junction transistor;
the third switch comprises an n-channel metal oxide semiconductor field effect transistor; and
the powered device comprises a Power over Ethernet splitter.

19. A method comprising:
directly connecting a first terminal and a second terminal of an Ethernet cable to a powered device;
providing a first voltage to the powered device through the first terminal;
receiving a power signal from the powered device through the second terminal;
activating a power gate and a controller in response to receiving the power signal from the powered device through the second terminal;
providing a return voltage to the powered device through the second terminal;
disconnecting the Ethernet cable from the powered device; and
deactivating the power gate and the controller in response to disconnecting the Ethernet cable from the powered device.

20. The method of claim 19, wherein a ratio of power consumed when the powered device is connected to the Ethernet cable to power consumed when the powered device is not connected to the Ethernet cable is at least 10.

* * * * *